Aug. 14, 1956　　　H. J. ECKWEILER, JR　　　2,758,500
OPTICAL ARTIFICIAL HORIZON
Filed July 28, 1952

INVENTOR.
HOWARD J. ECKWEILER Jr.
BY
Ostrolenk & Faber
ATTORNEYS.

United States Patent Office 2,758,500
Patented Aug. 14, 1956

2,758,500

OPTICAL ARTIFICIAL HORIZON

Howard J. Eckweiler, Jr., Manhasset, N. Y., assignor to Kollsman Instrument Corporation, Elmhurst, N. Y., a corporation of New York Application July 28, 1952, Serial No. 301,245

1 Claim. (Cl. 88—2.3)

The present invention relates to means for determining the relation of a point of observation to a plane of reference and more particularly to a means for providing an indication of a horizontal plane in an optical system utilizing the reflection of the image of an illuminated aperture from the surface of a reflecting liquid.

Horizontal plane determining means are used in connection with optical systems in altitude measuring instruments and in elevation measuring instruments. A sextant, for example, measures the altitude of a celestial body by reference to the angle that the celestial body makes with a horizontal plane at the observation point.

Heretofore in the prior art the artificial means for establishing a horizontal reference plane have included gyroscopic means, pendulums, and illuminated bubbles.

It is desirable to have the images of the sighted object and the horizontal reference means simultaneously observable.

It is, therefore, a primary object of the present invention to provide a novel optical horizontal reference in which the surface of a reflecting fluid is utilized to provide the horizontal reference.

Still another object of the present invention is to provide a chamber construction for a horizontal reference which will permit universal tilting of the chamber without changing the characteristics of the optical path within the chamber.

A basic object of the present invention is the provision of a novel artificial horizon means utilizing a liquid wherein the relatively small expansions and contractions of the liquid due to variations in environmental conditions have negligible effect on the accuracy of the artificial horizon as a reference.

An essential object of the present invention is the provision of a novel artificial horizon means utilizing the outer surface of the boundary of a volume of fluid as a reflector.

Still another object of the present invention is the provision of a novel artificial horizon means utilizing the inner surface of the boundary of a volume of fluid as a reflector.

Still another object of the present invention is the provision of a novel horizon reference which can produce a sharply defined reference image.

The present invention is carried out by providing a means for illuminating either the outer boundary or the inner boundary of the upper surface of a fluid through a slit. The surface of the fluid acts as a reflector, reflecting the light to a pellicle (or beam splitter) which partially reflects and partially transmits the light. The plane of the pellicle is at 45° to the path of the light and reflects the horizontal reference image in an eyepiece. The horizontal image reference and the object to be viewed (a celestial body in the case of a sextant) are thus viewed simultaneously in the eyepiece.

The foregoing and many other objects of the invention will become apparent in the following description and drawings in which.

Figure 1:
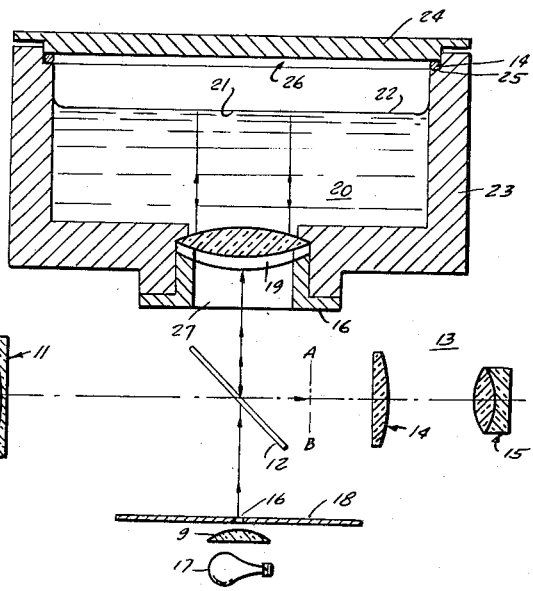
Figure 1 is a vertical sectional view of a modification of the present invention combined with a simple optical system shown in diagrammatic arrangement wherein the surface reflection is accomplished from the underside of the upper surface of the reflecting medium.

Referring now to Figure 1, the optical horizontal reference is shown as it might be utilized in its simplest form to level an instrument. It is readily understood, however, that the artificial horizon may be used in any other application where it is necessary to determine the vertical or horizontal reference as in leveling tables, sextants, and other general constructions in which a horizontal or vertical reference is desired.

In the simple leveling instrument herein disclosed there is shown an objective lens 11 whos focal plane is at AB. The image of the objective passes through a transparent reflector glass or pellicle 12 before reaching the focal plane AB and thereafter enters the eyepiece 13 consisting of lenses 14 and 15.

An artificial horizon is indicated by providing the image of a slit 16, hereinafter described, at the focal plane AB.

A light source 17 shown as an incandescent lamp illuminates the slit 16 in mask 18 through a condenser lens 9. The light from the illuminated slit 16 in mask 18 passes through the transparent reflector glass 12 and a lens 19. The transparent reflector glass 12 is positioned at a 45° angle with respect to the axis of the optical system described above.

After passing through lens 19 the light rays from the illuminated slit pass through the liquid 20 and are reflected from the underside 21 of the surface 22.

The reflected image passes again through the liquid 20 and the lens 19 to the reflecting surface of the transparent reflecting glass 12 described above. The transparent reflecting glass is at a 45° angle to longitudinal axis of lens 19 as well as to the optical path of the objective image.

The reflected image is then reflected again from the transparent reflector glass 12 essentially along the same optical axis described above forming a real image of the illuminated slit 16 at the focal plane AB.

The correspondence of the image of the illuminated slit 16 and the image of the observed object can be used as is hereinafter described to indicate that the level of the observed object is the same as the line of sight or the optical axis of the instrument.

The reflecting surface 21 is so located as to have the combined horizontal and vertical optical distance from it to the focal plane AB be one-half of the focal length of the objective lens 11. When so located, the angular movements of the optical axis and the slit image will be the same and no accommodation of the eye will be required to view simultaneously the slit image and the observed objective.

The fluid 20 is contained in a cup shaped member 23. The member 23 bears a cover plate 24 on a sealing annulus 14. The inner surface 26 of cover plate 24 is coated with an optically black substance.

The optically black surface is provided to eliminate any reflections within the member 23 other than the reflections from the surface 22 as described above.

The lower portion of the member 23 is provided with an opening 27 in which is disposed the lens 19. The lens 19 is suitably clamped therein by means of a sealing ring 28.

The light rays then, from the light source 17 pass through slit 16, transparent glass 12, lens 19, fluid 20 and are reflected from the surface 22 back through the lens 19 to the reflecting surface of the glass 12 to form a real image of the slit 16 at the focal plane AB of the optical system.

In this manner, the coincidence of the slit image with an observed object may be used to indicate that the level of the object is the same as that of the line of sight of the instrument. If it is desired to maintain the axis of the instrument itself horizontal, as in a level, a simple scratched transparent reticle (not shown) may be placed at the focal plane AB so that the slit image may be imposed thereon to establish the instrument axis in a horizontal plane.

The inner surface of lens 19 is at all times in contact with the fluid 20 thereby maintaining at all times the same index of refraction difference between the lens 19 and the fluid 20.

The instrument as described above may be employed in conjunction with a photo-electric scanning device in a servo-mechanism which levels the whole assembly in either one or two degrees of freedom.

Figure 2:
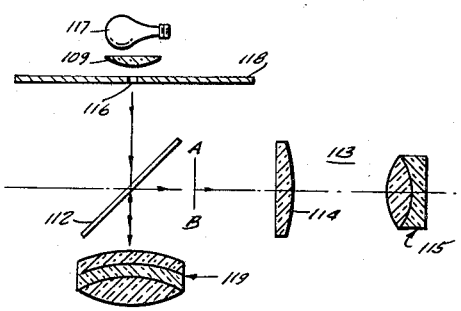
Figure 2 is a vertical sectional view of a further embodiment of the present invention combined with a simple optical system shown in diagrammatic arrangement wherein the surface reflection is accomplished from the upper surface of the reflecting medium, which medium may be either opaque or transparent.
Figure 2:
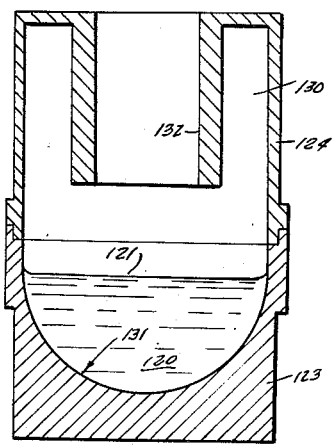

In the embodiment of the invention shown in Figure 2, the light rays from the source 117 pass through the condenser lens 109, slit 116 of mask 118, transparent reflecting glass 112, lens 119 to liquid 120 and are reflected from the upper surface 121 of the liquid 120 back through the lens 119 and from the reflecting surface of the transparent reflecting glass 112 to from a real image of the slit 116 at the focal plane AB of the optical system. The liquid 120 may be either transparent or opaque.

The optical system comprises an objective lens 111, the transparent glass 112 and an eyepiece 113 containing lenses 114 and 115. The focal length of the lens 111 is its distance to the plane AB.

The structural embodiment as shown in Figure 2 provides space 130 as a trap for the liquid 120 in the event of an inversion of the optical system, thereby preventing the liquid 120 from reaching the lens 119 to change its refractive properties and to prevent the liquid 120 from being thrown out of the liquid chamber. The liquid 120 is contained in a member 123 having an inner cup-shaped surface 131. The inner hemispherical surface 131 of the member 123 is coated with an optical black substance to eliminate extraneous reflections. This coating is unnecessary if the liquid 120 is opaque. The member 123 bears a cover plate 124 having an internal inwardly projecting flange 132 developing a space 130 as a trap for the liquid 120 in the event of an inversion of the artificial horizon.

In the foregoing the invention has been described solely in connection with specific illustrative embodiments thereof. Since many variations and modifications of the invention will now be obvious to those skilled in the art, it is preferred to be bound not by the specific disclosures herein contained but only by the appended claim.

I claim:

An optical instrument comprising in combination an optical sighting system and an artificial horizon, said optical sighting system comprising a combination of lenses developing an original line of sight, including an objective lens, a light source having a mask, an aperture in said mask, a transparent-reflecting glass in the line of sight of said optical sighting system and in the path of light from said aperture, a freely movable fluid surface from which the light from said aperture is reflected through said fluid to form an image of said aperture, an enclosure for said fluid, a lens at the bottom of said enclosure through which light from said aperture passes to and from the underside of said fluid surface, said transparent-reflecting glass being in the path of said reflected light to position said image in the line of sight of said optical sighting system, and an optically black surface at the top of said enclosure so that reflection is accomplished only from said fluid surface, said image of said aperture formed at the focal point of said optical sighting system thereby providing an indication of the horizon in the line of sight of said optical sighting system.

References Cited in the file of this patent

UNITED STATES PATENTS

| | | |
|---|---|---|
| 2,124,892 | Nichols | July 26, 1938 |
| 2,173,142 | Thurlow et al. | Sept. 19, 1939 |
| 2,432,875 | Flint | Dec. 16, 1947 |
| 2,460,836 | Lovins | Feb. 8, 1949 |
| 2,557,340 | Carbonara | June 19, 1951 |

FOREIGN PATENTS

| | | |
|---|---|---|
| 15,079 | Great Britain | June 23, 1914 |
| 313,882 | Germany | July 21, 1919 |